United States Patent [19]

Tommis

[11] Patent Number: 4,531,985
[45] Date of Patent: Jul. 30, 1985

[54] SURFACE TREATMENT OF METAL RINGS

[75] Inventor: Norman Tommis, Bradford, England

[73] Assignee: AE PLC, Rugby, England

[21] Appl. No.: 449,205

[22] Filed: Dec. 13, 1982

[30] Foreign Application Priority Data

Dec. 16, 1981 [GB] United Kingdom ............... 8137940

[51] Int. Cl.$^3$ .................... C21D 9/40; C23C 11/14
[52] U.S. Cl. .................... 148/16.6; 29/156.6
[58] Field of Search .............. 148/15.5, 16.5, 16.6, 148/31.5, 39; 29/156.6; 277/224

[56] References Cited

U.S. PATENT DOCUMENTS

| | | | |
|---|---|---|---|
| 2,014,440 | 9/1935 | Lee | 148/131 |
| 2,027,116 | 1/1936 | Oubridge | 148/131 |
| 2,417,610 | 3/1947 | Phillips | 148/131 |
| 4,299,401 | 11/1981 | McCormick | 29/156.6 |

FOREIGN PATENT DOCUMENTS

| | | | |
|---|---|---|---|
| 2,505,118 | 8/1976 | Fed. Rep. of Germany | 148/16.6 |
| 2934027 | 4/1980 | Fed. Rep. of Germany | 277/224 |
| 69744 | 5/1980 | Japan | 277/224 |
| 116870 | 9/1981 | Japan | 148/16.5 |

OTHER PUBLICATIONS

Bell, "Ferritic Nitrocarburizing", Heat Treatment of Metals, 1975, pp. 39-49.
Metals Handbook, 8th Edition, vol. 2, "Heat Treating, Cleaning and Finishing", American Society for Metals, 1964, pp. 93 and 119-128.

Primary Examiner—Peter K. Skiff
Attorney, Agent, or Firm—Leydig, Voit, Osann, Mayer & Holt, Ltd.

[57] ABSTRACT

A metal ring of generally rectangular cross-section has its radially outer surface and its side surfaces treated by being stacked with its sides in contact with other rings in a chamber. Air is excluded from the chamber and a gaseous mixture of a carburizing gas and a nitrogenous gas at a temperature of 450° C. to 650° C. is supplied to the chamber. The proportions (% by volume) of the gases is between 25:75 and 75:25. The mixture nitro-carburizes both the radially outer surface of the stacked rings and the sides of the ring. If the rings are finish machined before treatment, they are ready for use as soon as they are removed from the chamber. The nitro-carburizing treatment reduces wear on the treated surfaces. The rings are used as piston rings or sealing rings.

4 Claims, 4 Drawing Figures

SURFACE TREATMENT OF METAL RINGS

BACKGROUND TO THE INVENTION

1. Field of the Invention

The invention relates to nitro-carburised metal rings for use as piston rings or sealing rings.

Piston rings and sealing rings are commonly made of steel or cast iron and are generally rectangular in cross-section. The ring is located in and projects from a groove and has a radially outer surface in sliding contact with a co-operating surface of, for example, a cast iron cylinder. Two generally radially extending surfaces (herein after called "sides") engage with walls of the groove during the sliding movement. As a result of this both the radially outer surface and the sides are subjected to wear. Various techniques have been proposed for reducing some of this wear in order to increase the life of the ring and particular attention has been given to the reduction of the wear of the radially outer surfaces and the co-operating cylinder or liner. More recently, however, engine life requirements not only reduced wear of the radially outer surfaces but also reduced wear of the sides and the co-operating groove walls.

2. Review of the Prior Art

One technique for reducing wear of the radially outer piston ring surfaces is immersing the rings in a nitro-carburising salt bath containing sodium and potassium salts with the rings heated to a temperature of, say, 400° C. In this nitro-carburising process, certain steels and cast irons of all types, e.g. grey irons, carbidic, martensitic, bainitic and spheroidal (nodular graphitic irons), have nitrogen and carbon simultaneously diffused into their surface to form a hardened surface layer.

British Patent Specification No. 1,576,143 discloses a process of salt bath nitro-carburising the surface of a sintered metal piston ring or sealing ring. The rings are immersed in the salt bath in a stack i.e. with their sides in contact under the pressure of a weight. This is necessary because, if spaced apart, the rings will warp and lose their shape and flatness and also because individual treatment of each ring would be time consuming and expensive.

In this process, however, only the radially outer surfaces of the rings are nitro-carburised, because the rings are in a closed stack. In addition, the use of a salt bath is both slow and messy.

An alternative technique has been chromium plating in which the rings are again placed in a closed stack with their radially extending side surfaces in contact and then plated on their radially outer surfaces with chromium in a conventional way. In order to prevent the plating bridging adjacent rings, it is necessary to chamfer the edges of the rings between the radially outer surface and the sides. This is shown in FIG. 1 which is a photo-micrograph of a part of a cross-section of a piston ring at a corner between a radially outer surface of the ring and a side of the ring.

In this process only the radially outer surfaces of the rings are plated as will be seen from FIG. 1. The sides can be chromium plated in a subsequent plating operation but this is relatively expensive. The chamfered edges of the rings, when in use, tend to increase oil seepage past the rings and thus tend to increase oil consumption, as well as reducing the effectiveness of the seal between the ring and the cylinder so increasing blow-by. Thus chamfers are undesirable. Further, chromium plating softens progressively at temperatures above 250° C. to 300° C. and this is also a disadvantage. In addition, the chromium plated rings require finishing operations which involve lapping and this increases the cost of their production.

SUMMARY OF THE INVENTION

According to a first aspect of the invention, there is provided a process for nitro-carburising metal rings of generally rectangular cross-section for use as piston rings or sealing rings, and comprising forming a stack of rings with adjacent rings in contact, placing the stack of rings in a chamber from which air is excluded and then supplying to the chamber a gaseous mixture of a carburising gas and a nitrogenous gas in the ratio of from 25:75 to 75:25 (% by volume) at a temperature of from 450° C. to 650° C. to nitro-carburise the radially outer surface and the sides of the rings.

It has been found that the use of gaseous nitro-carburising allows the nitro-carburising treatment to extend not only over the radially outer surfaces of the rings in a stack but also over the sides even though the rings are in a stack. This therefore gives all these three surfaces a hardened finish, thus increasing their overall wear resistance.

According to a second aspect of the invention, there is provided a piston ring for an engine or a compressor or a sealing ring for a shock absorber when made by the method of the first aspect of the invention.

According to a third aspect of the invention, there is provided a metal ring of generally rectangular cross-section for use as a piston ring or a sealing ring, the ring having a radially outer surface and sides hardened by nitro-carburising and being finish machined before nitro-carburising.

BRIEF DESCRIPTION OF THE DRAWINGS

The following is a more detailed description of some embodiments of the invention, by way of example, reference being made to the accompanying drawings, in which.

DESCRIPTION OF THE PREFERRED EMBODIMENTS

Figure 1:
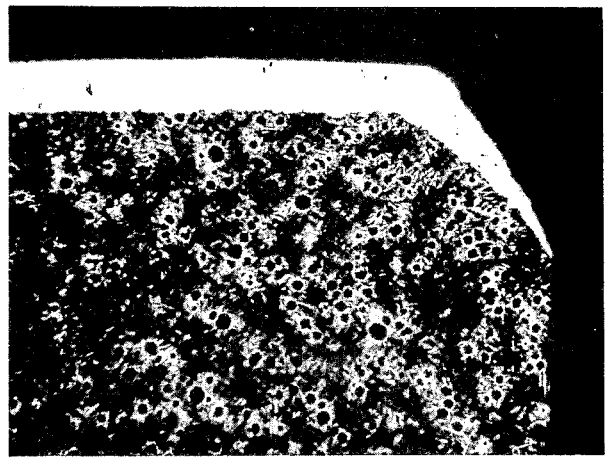
FIG. 1 is a photo-micrograph of a prior art chromium plated piston ring.

A piston ring is prepared and is finished machined to be of generally rectangular cross-section with a gap cut through the ring to afford two free ends. The ring thus has a radially outer surface which, in use, will be in sliding contact with an engine cylinder, and two radially extending surfaces or 'sides' which will contact the walls of a piston ring groove in a piston in which the ring is mounted. The piston ring may be of the rail type used as oil control rings or a top ring (i.e. the ring closest to the crown of the associated piston), in particular a top compression ring.

The ring may be of any suitable ferrous material which can be satisfactorily nitro-carburised and which maintains its hardness, and hence its spring and resistance-to-set, both when treated and when run in an engine. Two such materials are high strength carbitic cast irons and steel. For example, a suitable steel has the composition 0.47% carbon, 0.25% silicon, 0.75% manganese, 0.55% nickel, 1% chromium, 1% molybdenum, 0.1% vanadium, remainder iron (all by weight) hardened and tempered to a hardness of 450–500 HV.

A plurality of such finish machined rings are placed on a jig in a stack with their sides in contact and with their gaps open. This ensures that during subsequent operations the rings remain flat and undistorted.

The stack of rings are then placed in a chamber from which air is excluded. Next a nitrogenous gas, such as ammonia, and a carburising gas, such as an exothermic hydrocarbon gas, are fed into the chamber at a temperature of between 450° C. and 650° C. The proportion of the two gases, nitrogenous to carburising, may be between 25:75 (% by volume) and 75:25 (% by volume) although tests with ammonia and exothermic hydrocarbon gas have shown that ratios of 50:50 (% by volume) or 60:40 (% by volume) give improved results.

The gases reach the radially outer surfaces of the stacked rings and also penetrate between the rings to reach the sides of the rings. Carbon and nitrogen from the gases diffuse from these surfaces into the cast iron of the rings forming a white "ξ" layer between 2 and 10 micrometers thick from which diffusion takes place into the body of the rings. For a particular material, the total depth of penetration depends on the time for which the gases are supplied and this may be regulated to give, for example, a white layer 5 micrometers thick and a total penetration of 0.1 m to 0.3 mm. A surface hardness of 700–800 HV is achievable decreasing progressively to the hardness of the basic material. This hardness is maintained on subsequent exposure of of the rings to temperatures of up to 600° C.

The stack of rings is then removed from the chamber and the rings separated from the stack. This is achieved without difficulty and the rings are ready for use forthwith without any further treatment. The piston rings so produced may be compression rings or oil control rings. The treatment is rapid and clean and provides in a single treatment a ring which is hardened on three surfaces.

Figure 2:
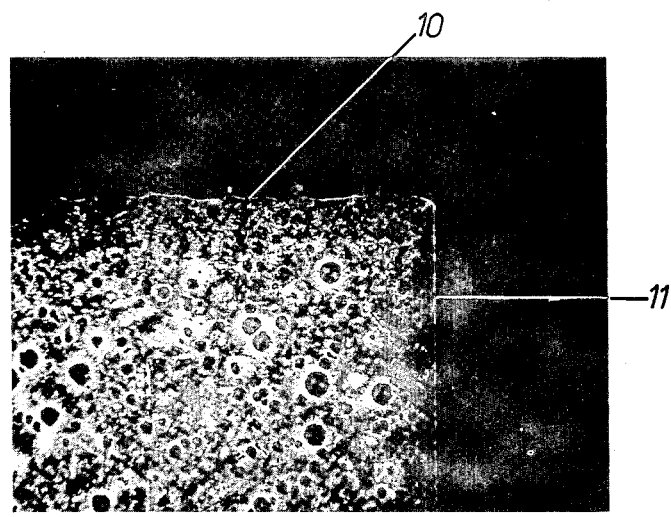
FIG. 2 is a photo-micrograph of a cross-section of a part of a nitro-carburised piston ring at the corner between a radially outer surface of the ring and a side of the ring.

A part of a finished ring is shown in FIG. 2. It will be seen that the nitro-carburised surface extends over both the radially outer surface 10 and the side 11. It will also be seen that the corner between these two surfaces is a sharp right angle.

The following Examples are given by way of illustration.

EXAMPLE 1

A piston ring of high strength carbitic steel was nitro-carburised as described above at a temperature of 550° C. In one embodiment, the piston ring was exposed to the nitro-carburising gases for a time which gave a total penetration of 0.10 mm and a compound white surface "ξ" layer whose thickness was 0.005 mm. The surface layer had a hardness of HVM700–800.

Figure 3:
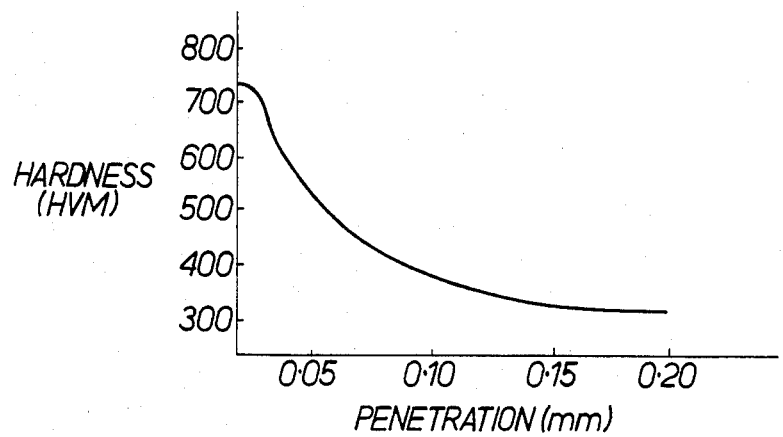
FIG. 3 is a graph of hardness against penetration (in millimeters) for a first example of a piston ring prepared in accordance with the invention.

A typical hardness penetration curve for such a piston ring is as shown in FIG. 3.

Nitro-carburised piston rings prepared as described above were used as the top compression piston rings in a two liter engine of a motor car. The rings were found not to scuff and to give satisfactory performance. In contrast, chromium plated piston rings prepared as described above with reference to FIG. 1 were found to scuff and be unusable. As a result of this, the engine had previously used hard flame sprayed molybdenum rings, which are expensive and difficult to manufacture.

Nitro-carburised piston rings, prepared as described above with reference to Example 1 were also compared with chromium plated piston rings prepared as described above with reference to FIG. 1 by fitting the nitro-carburised rings in the top ring grooves of the piston in cylinders 1 and 3 of a 4-cylinder 1.3 liter petrol engine. The chrome plated rings were fitted in the top ring grooves of cylinders 2 and 4.

After 50,000 miles the following results were obtained:

| Cylinder No. | Surface Treatment | Ring Side Wear (m × 10⁻⁴) | Groove Side Wear (m × 10⁻⁴) | Ring Radial Wear (m × 10⁻⁴) | Max. Bore Wear (m × 10⁻⁴) |
|---|---|---|---|---|---|
| 1. | N.C. | 0.25 | 0.104 | 1.65 | 0.63 |
| 2. | Chrome | 0.61 | 0.12 | 1.9 | 0.51 |
| 3. | N.C. | 0.18 | 0.11 | 2.03 | 0.51 |
| 4. | Chrome | 0.76 | 0.12 | 1.9 | 0.63 |

N.C. - Ring nitro-carburised on O.D. and side faces as described above by way of example.
Chrome - Plated on outside diameter only - not treated on side faces.

The piston ring of Example 1 has an elastic modulus and core hardness which are unaffected by the treatment. The fatigue strength is increased by approximately 10%. Although the piston ring of Example 1 is more brittle than an untreated ring, when subjected to excessive twisting or gap opening, the ring still meets the required minimum ring tensile and bending strengths as laid down for untreated rings.

EXAMPLE 2

A piston ring of steel was prepared, the steel having the following composition by weight:
carbon: 0.47%
silicon: 0.25%
manganese: 0.75%
nickel: 0.55%
chromium: 1%
molybdenum: 1%
vanadium: 0.1%
balance iron The piston ring was hardened and tempered to a hardness of 450–500 HV and then nitro-carburised as described above. In one embodiment, the piston ring was exposed to the nitro-carburising gases for a time which gave a total penetration of 0.015–0.020 mm and a compound white surface "ξ" layer whose thickness was 0.005–0.008 mm. The surface layer had a hardness of about HVM800.

Figure 4:
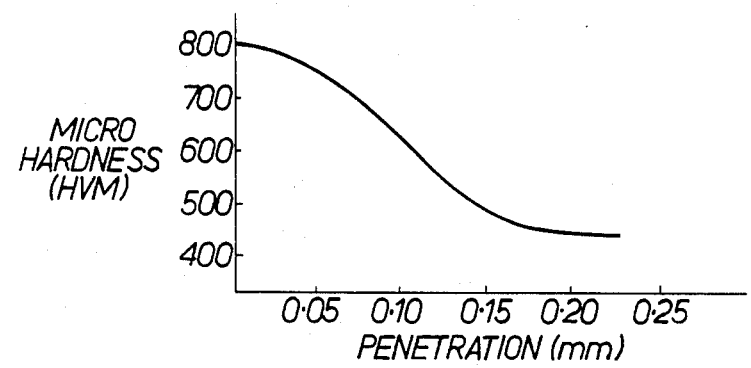
FIG. 4 is a graph of hardness against penetration (in millimeters) for a second example of a piston ring prepared in accordance with the invention.

A typical hardness penetration curve for such a ring is as shown in FIG. 4.

Nitro-carburised piston rings prepared as described above were used in the top compression piston rings in a two liter engine of a motor car. The rings were found not to scuff and to give satisfactory performance. In contrast, chromium plated piston rings prepared as described above with reference to FIG. 1 were found to scuff and be unusable. As a result of this the engine had previously hard flame sprayed molybdenum rings, which are expensive and difficult to manufacture. Nitro-carburised piston rings, prepared as described above with reference to Example 2 were also compard with chromium plated piston rings prepared as described above with reference to FIG. 1 by fitting the nitro-carburised rings in the top ring grooves of the piston in cylinders 1 and 3 of a 4-cylinder liter petrol engine. The chrome plated rings were fitted in the top rings grooves of cylinders 2 and 4.

After 180 hours (equivalent to 15,000 miles under high speed test conditions) the following results were obtained:

| Cylinder No. | Surface Treatment | Ring Side Wear (m × 10$^{-4}$) | Groove Side Wear (m × 10$^{-4}$) | Ring Radial Wear (m × 10$^{-4}$) | Max. Bore Wear (m × 10$^{-4}$) |
|---|---|---|---|---|---|
| 1. | N.C. | 0.013 | 0.10 | 0.025 | 0.08 |
| 2. | Chrome | 0.051 | 0.10 | 0.51 | 0.15 |
| 3. | N.C. | 0.025 | 0.08 | 0.025 | 0.13 |
| 4. | Chrome | 0.08 | 0.08 | 0.38 | 0.18 |

N.C. - Ring nitro carburised on O.D. and side faces as described above by way of example.
Chrome - Plated on outside diameter only - not treated on side faces.

The piston ring of Example 2 maintained its spring and wall pressure at top ring groove operating temperatures. Its loss in gap when enclosed in a sleeve of bore diameter equal to the ring diameter and heated for 6 hours at 350° C. and cooled in the sleeve, was 5.5%. This compares with 7-10% for martensitic spheroidal grey modular cast iron rings (not nitro-carburised) and 15% or more for medium phosphorous grey cast iron rings (not nitro-carburised) individually cast.

It will be seen from the foregoing Examples 1 and 2 that the wear on the radially outermost surface of the nitro-carburised rings is comparable with that of chromium plated rings but that the wear of the sides is very much less than the side wear of the chromium plated rings. It will be appreciated that this wear resistance is achieved in a single treatment step. This reduction in wear improves the sealing performance of the rings and also increases their life because the increase in fatigue strength coupled with reduced side wear reduces the incidence of breakage and reduces the rate of increase of blowby.

The radially outer surfaces of nitro-carburised rings have a better scuff-resistance than the corresponding surfaces of chromium plated rings. This is partly because of the better resistance of nitro-carburised surfaces to temperatures above 250° C. to 300° C. and because oil does not readily wet chromium whereas the nitro-carburised surface retains the cavities formed by graphite flakes in the iron and these act as oil reservoirs.

It will further be appreciated that the nitro-carburising process described above with reference to FIG. 2 may be used to harden the surfaces of any form of piston ring such as oil control rings or intermediate compression rings, or any form of sealing ring, such as sealing rings for shock absorbers.

When the rings are made of steel, the use of the nitro-carburising technique described above by way of example allows the width of the rings to be reduced to 1 mm or less because the reduced side wear reduces the incidence of breakage. Where the rings are of the rail type, the nitro-carburising of the sides of the ring reduces wear between the ring and the expander used in such oil control ring assemblies and minimises the cut into the rail of lugs provided on the expander.

I claim:

1. A process for treating piston rings, each ring having upper and lower radially extending side surfaces and a radially outer surface between said side surfaces, the process comprising the steps of forming the rings from a ferrous material,
   forming a plurality of the rings into a stack with the side surfaces of adjacent stacked rings in contact,
   placing the stack of rings in a chamber,
   supplying to the chamber a gaseous mixitre of an exothermic hydrocarbon gas and ammonia gas in the ratio of 40:60 (by volume) at a temperature of 550° C. to 570° C. to nitro-carburise the outer surface and the side surface of the rings to a depth of from 0.1 mm to 0.3 mm in a single treatment step,
   continuing the treatement for a time of from 2 to 3 hours
   and then removing the stack of rings from the chamber and separating the treated rings to provide individual rings having a hard "ξ" layer both on the outer surface and on the side surfaces thereof.

2. A process according to claim 1 wherein the rings are finish machined before being stacked, so that after the nitro-carburising process they are ready for use.

3. A process according to claim 1 and in which the rings have a gap therein, and are to form piston rings, the rings being stacked with their gaps open.

4. A process for treating cast iron piston rings of generally rectangular cross-section having a radially outer surface for sliding contact with an associated engine cylinder and two sides for contacting the walls of an associated piston ring groove, the process comprising the steps of forming the piston rings from cast iron,
   finish machining the cast iron piston rings to final dimensions,
   stacking a plurality of said piston rings together to form a stack in which side surfaces of adjacent piston rings are in contact,
   placing the stack of piston rings in a chamber,
   supplying to the chamber a gaseous mixture of an exothermic hydrocarbon gas and ammonia in the ratio of 40:60 at a temperature of 550° C.,
   continuing the treatment for a period of from 2 to 3 hours,
   and then removing the piston rings from the chamber and separating the piston rings to provide finished cast iron piston rings having a hardened layer to a depth of from 0.1 to 0.3 mm on both the sides and the radially outer surface of the piston rings.

* * * * *